United States Patent [19]
Wallsten

[11] 3,970,328
[45] July 20, 1976

[54] METHOD AND BLANK FOR MANUFACTURING SHOCK-ABSORBING SAFETY DEVICES FOR VEHICLE PASSENGERS

[75] Inventor: Hans Ivar Wallsten, Saffle, Sweden
[73] Assignee: AB Inventing, Saffle, Sweden
[22] Filed: July 19, 1973
[21] Appl. No.: 380,834

[30] Foreign Application Priority Data
Feb. 12, 1973  Sweden ............................. 7301930

[52] U.S. Cl. ...................................... 280/731; 52/2
[51] Int. Cl.² ......................................... B60R 21/08
[58] Field of Search .......... 280/150 AB; 244/138 R, 244/DIG. 2, 146; 116/DIG. 9; 52/2; 5/348; 9/2 A, 11 A

[56] References Cited
UNITED STATES PATENTS

| | | | |
|---|---|---|---|
| 1,964,818 | 7/1934 | Hood | 52/2 |
| 2,297,150 | 9/1942 | Hunter | 52/2 |
| 2,771,899 | 11/1956 | Swallert | 52/2 X |
| 3,056,980 | 10/1962 | Holladay | 9/13 X |
| 3,279,419 | 10/1966 | Demarco | 116/DIG. 9 |
| 3,675,942 | 7/1972 | Huber | 280/150 AB |
| 3,742,658 | 7/1973 | Meyer | 52/2 |
| 3,813,716 | 6/1974 | Francis | 5/348 R |

FOREIGN PATENTS OR APPLICATIONS
358,094  10/1931  United Kingdom ...................... 52/2

*Primary Examiner*—Robert B. Reeves
*Assistant Examiner*—Frederick R. Handren
*Attorney, Agent, or Firm*—Ostrolenk, Faber, Gerb & Soffen

[57] ABSTRACT

Method and blank for producing safety bags comprising foldable enclosures expandable by means of a gastight channel network arranged along the surface of the enclosure to cause the enclosure to fill with ambient air in the expansion process. The enclosure is formed of sections joined along their peripheries whose shapes serve to define the final expanded three-dimensional shape of the enclosure. The channels lie at or near the jointure between sections. Various methods of forming and assembling the channels, sections and shells are set forth.

3 Claims, 32 Drawing Figures

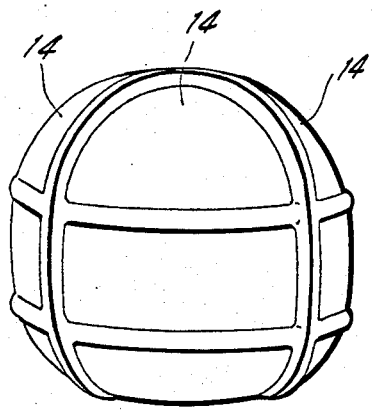
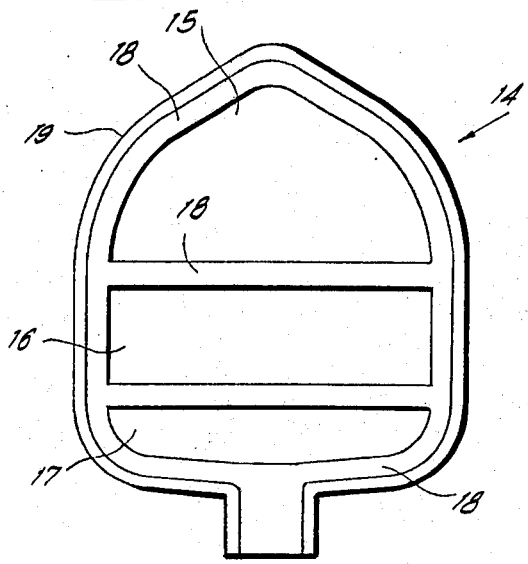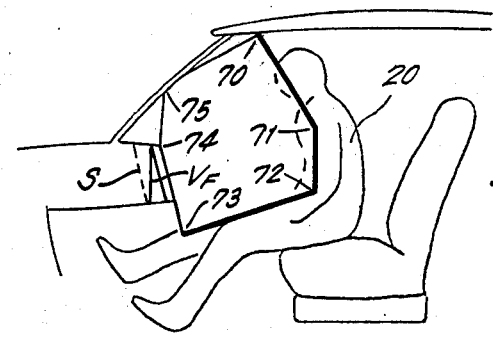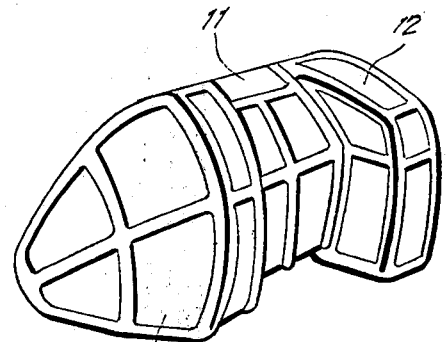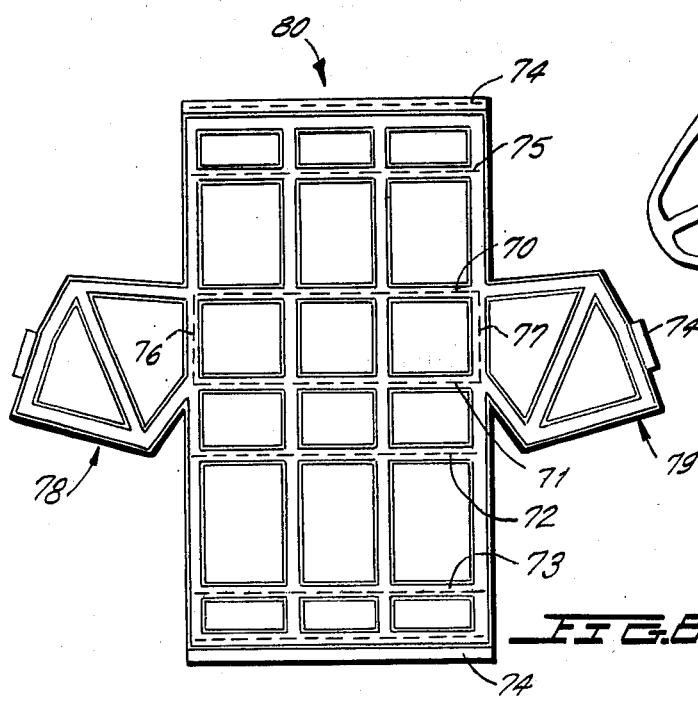

METHOD AND BLANK FOR MANUFACTURING SHOCK-ABSORBING SAFETY DEVICES FOR VEHICLE PASSENGERS

The present invention relates to a method and blank for manufacturing a shock-absorbing safety device intended for passengers in vehicles, comprising an enclosure which can be expanded from a folded state, having a system of channels, also expandable and foldable, connectively arranged within the walls of the enclosure, said enclosure being expanded by the supply of compressed gas to said channels to define a predeterminable configuration. When employed as a collision protection means, the invention consists of an enclosure, which is rapidly expanded from the folded state in the event of a collision, by compressed gas being quickly supplied through suitable means to a channel system, also folded and expandable, connected to the wall of the enclosure. This wall is thus forced by the expansion to assume a predetermined configuration and the surrounding air is caused to at least partially fill the interior of the expanding enclosure. The protection means thus includes means to allow the surrounding air to enter the enclosure and, after the expansion, to retain the enclosed air so that the enclosure forms a pneumatic buffer.

BACKGROUND OF THE INVENTION

It is already known that by rapidly supplying gas a bag can be inflated at the moment of a collision and form a gas-filled buffer which thus acts as a shock-absorbing protection means. Since, expecially in the case of front-seat passengers, the bags or shells must be extremely large when inflated and the time for inflation must be extremely short, typically a few hundredths of a second, extremely high gas speeds are required to effect this inflation. This has in turn caused considerable problems due, amongst other things to the loud noise occuring as a result of the rapid inflation. In addition, the over-pressure occuring in a closed car, for example, when one or more of these protection means is rapidly inflated may damage the hearing mechanism of the passengers and even cause permanent injury.

BRIEF DESCRIPTION OF THE INVENTION

Arrangements exist which are aimed at avoiding the drawbacks involved with such protective arrangements. For instance, it has been suggested that the protective arrangements be inflated by supplying compressed gas to a system of channels having a limited volume, said channels being connected to the walls of the protective bag so that the folded bag can be rapidly made to expand by supplying limited quantities of compressed gas. At the same time, the ambient air inside the car fills the inside of the expanding bag, thus avoiding the drawbacks of the high gas speeds as well as over-pressure inside the car.

If a protective bag provided with channels is to be effective in the event of a collision, however, certain conditions must be fulfilled. First of all, the protective bag as well as the channels, when in the unexpanded state, must be capable of being easily folded and designed to occupy a minimum amount of space. During the rapid inflation the gas supplied must be able to fill the channels without too much obstruction so that they will be quickly straightened out from their folded state and become stiff. At the same time, the expanding channels shall cause the walls of the protective bag to assume a carefully predetermined configuration which has been designed, taking into consideration the various factors required for the bag to offer sufficient protection in the event of a collision, such as the distance between the passenger (or passengers) and those parts of the vehicle which are in front or at the side of the passengers. Thus, for instance, a protection means for the driver of the vehicle which is applied in the centre of the steering wheel must fill the entire region between the wheel and the upper half of the passenger's body when the bag expands. In this case, the expanded protection means should have such shape that when the driver is thrown against the protection means, the forces arising will be taken up by the wheel.

A protection means for a front-seat passenger should preferably be considerably larger in expanded state than the expanded protection means provided for the driver and should be designed to protect both the body and the legs of the passenger in a head-on collision. Furthermore, such a protection means should have a configuration which will if possible give protection even in the event of sideways collisions.

Since the protection means described is based on the principle of being capable of being expanded from the folded state to form a buffer between the passenger and certain parts of the vehicle, it is clear that the configuration assumed by the protection means when expanded must be calculatable in advance.

The present invention enables mass production of the enclosure for the protection means, where the above conditions are fulfilled. It has also been found that according to the invention such protection means can be produced inexpensively and without much wastage of material, which will always reliably and rapidly expand with very little deviation from the predetermined and calculated final configuration when fully expanded. This is achieved according to the invention by means of the features defined in the claims.

It is therefore one object of the present invention to describe a method for producing expansible enclosures such as safety bags and the like through the assemblage at least one blank having gas receiving channels which collectively define an enclosure expandible through said channels from its folded state to the fully expanded state and whereby the channels serve to define the shape of the expanded enclosure.

BRIEF DESCRIPTION OF THE FIGURES

The above as well as other objects of the invention will be further understood from the following description making reference to some embodiments shown in the accompanying drawings, in which:

FIG. 5 shows a perspective view of another embodiment of an expanded protection means according to the invention;

FIG. 6 is a plan view showing one of the wall elements in the embodiment shown in FIG. 5, in the form of a flat blank part;

FIG. 7 shows an elevational view of another embodiment of the invention intended for a front-seat passenger;

FIG. 8 shows the flat blank for the casing shown in FIG. 7;

FIG. 9 shows a perspective view of another embodiment of the invention;

DETAILED DESCRIPTION OF THE FIGURES

Figure 1:
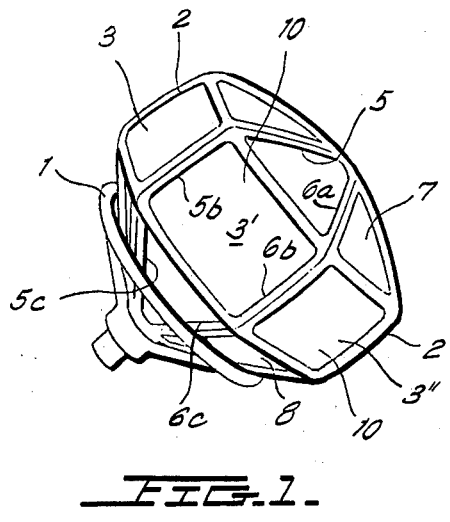
FIG. 1 shows a perspective view of a collision protection means according to the invention in expanded state.

FIG. 1 shows a protection means manufactured according to the invention and intended to protect the driver of a vehicle in a head-on or front end collision, for example. The protection means is shown in expanded state and 1 designates a steering wheel 1, at the center of which the bag-like protection means was originally stored in folded state. At the moment of collision a sensor can in known manner cause gas from a suitable gas source, for example a compressed gas container of compressed air, to expand rapidly in the channels 2 which are connected to the wall of the folded enclosure. The enclosure is thus brought to expand into the predetermined shape illustrated in FIG. 1, the channels 2 effecting expansion of the enclosure by being folded out and stiffened as they fill with gas. The fields 7, 10, 8 and so on, which together form the wall of the expanded enclosure, are thus spread out from their original folded state.

If a safety device of the type shown here is to be of any practical value, it must be capable of being folded so that it occupies very little space and the expansion must take place in several directions without too much resistance when the enclosure unfolds. This means that even in the unexpanded state, the channels 2 must likewise occupy little space and they must be limp and flexible so that during the expansion process they are quickly filled with compressed gas without offering too much resistance themselves.

Furthermore, it must be possible to easily and flexibly attach the channels along the greater part of their length to the corresponding wall section, so that the wall sections are pulled by the expansion of the channels 2 and stretch out to form substantially flat fields.

It has also been found advisable for the channels 2 to be at least partially in communication with each other. It has been found, namely, that if one of the channels 2 is folded unsuitably, this may obstruct the compressed gas during the expansion process. However, if this channel 2 is also in communication with the same source of compressed gass at its other end, i.e., if said channel constitutes a branch in the channel network, this risk is eliminated since the compressed gas can fill the channel system in spite of the obstruction, which can be opened from the other side.

It has also been found that said channels 2 and the channel network must be able to withstand relatively high pressure. Thus, by a suitable choice of the quantity of compressed gas in relation to the channel volume in expanded state, the time needed to expand the shell can be considerably reduced. This is essential in order to provide effective protection even at high vehicle speeds. It has thus been found in one instance that if the highest pressure in the channels during expansion of the enclosure had been increased by an alteration of pressure and volume in the compressed gas source from 0.4 kfg/cm$^2$ atm. over-pressure to 0.7 kfg/cm$^2$ atm. over-pressure, the time for expansion would have decreased from 0.020 sec. to 0.008 sec. This means that the protection means which, in the former case, meets present safety standards for vehicles travelling at speeds of up to 30 miles an hour, is now capable of providing effective protection at even greater speeds of up to 50 miles an hour, for example.

Since in certain cases considerably higher expansion pressures are desired, and in view of the considerable demands which must be placed on the reliability of protection means for collisions, it can be stated that the channel system and its connections should be able to withstand pressures many times greater than those mentioned hereinabove at the initial stages of expansion. It has also been found possible in some embodiments of the invention to produce casings with gas-tight channel systems which will withstand expansion pressures of 6 atm. over-pressure and above.

The source of compressed gas may, for example, be a container having compressed gas such as air, or a gas generator intended to produce relatively large quantities of gas in a very short period of time. The quantity of gas required is dependent on the design of the channel system. If the channel system is not sufficiently gas-tight, relatively large quantities of gas will be needed compared to the quantity needed for a gas-tight system. Considering that the protection means with its channels must be mass produced inexpensively, it might be thought that it would be an advantage for the channel system not to be airtight. However, since this requires greater quantities of compressed gas, a completely gas-tight channel system is to be preferred.

According to the invention, the channel system can be manufactured simply and inexpensively. Since each channel consists of an upper part and a lower part made from material blanks cut from flat pieces of material, channels having branch conduits forming a communicating channel system can be manufactured by joining the flat upper and lower parts.

Individual variations caused by manufacturing methods, for example, in the form of gas-leakage in the channels, are undesirable. For mass production, the compressed gas source, as well as the volume and pressure of the compressed gas enclosed, must be assumed to be standardized, and individual testing of suitable values due to said individual variations, for example, in possible leakage in connection with the installation of the device, must be considered too time-consuming and expensive.

Figure 2:
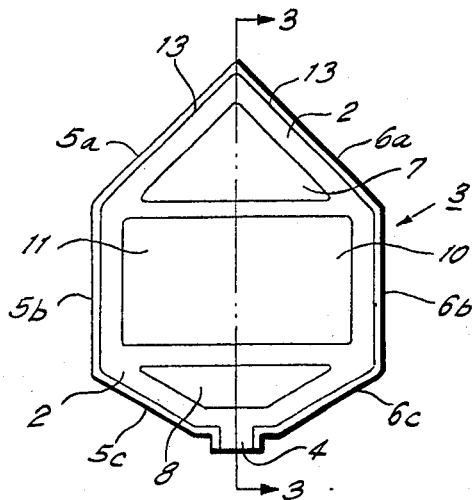
FIG. 2 shows the wall elements forming the protection means according to FIG. 1, in the form of a flat blank part.
Figure 3:
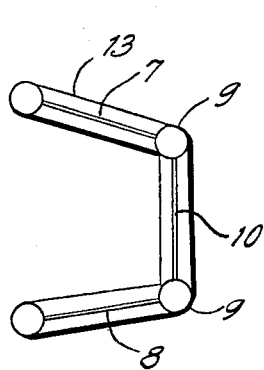
FIG. 3 shows the cross section through one of the wall elements forming the protection means according to FIG. 1 and taken along the line 3 — 3.

The enclosure shown in FIG. 1 is suitably constructed of wall elements or blanks 3 manufactured from flat and preferably limp pieces of material, and such a blank section is shown in FIG. 2. In the embodiment according to FIG. 1, the enclosure has been constructed by joining six similar blank parts 3, 3', and so on. As can be seen, the channels 2 in the blank according to FIG. 2 form a network or channel system so that the blank 3 is straightened out when the channels 2 are filled with compressed air. 4 designates a supply point for compressed gas. The six similar blank sections 3, 3', etc., according to FIG. 2 are joined in the embodiment according to FIG. 1 along the free marginal edges 5a, 5b, 5c and 6a, 6b, 6c, respectively to the adjacent blank sections. When stretched out, each blank comprises three fields, namely the bottom part 7, the top part 8 and a central part 10, each of which is substantially surrounded by channels 2, also manufactured from flat pieces of material in a manner which will be described hereinbelow. It can easily be seen that when compressed gas is supplied from the supply point 4, the originally folded and unexpanded blank is straightened out due to the expansion of the channels 2 so that each of the fields 7, 8 and 10 in this case form a flat surface. Since each blank is joined along its free edges 5a, 5b, 5c and 6a, 6b, 6c to adjacent blanks 3', 3'', etc., forces also occur due to the expansion and these forces cause the fields 7 and 8 to deviate from the plane formed by the field 10 and ultimately assume the configuration shown in FIG. 3. This figure shows a section along the line 3 — 3 in FIG. 2, the blank having been caused to assume the configuration shown in FIG. 1 with inwardly sloping bottom and top sections 7 and 8, respectively. Due to the forces exerted during the expansion process as well as the retaining forces between the joined blanks 3, 3', etc., parts of the channel system will be curved, for example at an intersection point 9 (FIG. 3) since the channel is designed in such a way that deflection or bending occurs most easily just around that point.

Figure 4:
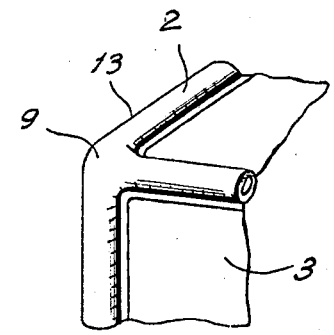
FIG. 4 shows a perspective detailed enlargement of part of the expanded protection means shown in FIG. 1.

FIG. 4 shows in perspective a part of the inflated casing, 9 designating an intersection point of the channels.

At the moment of collision, compressed gas is supplied by means of arrangements known per se, via a suitably arranged compressed gas distributor. The protection means is provided in a suitable manner with, for example, one-way non-return valves, such as for example flap valve $V_F$ (see FIG. 7) which opens during expansion of the enclosure so that the air inside the vehicle can fill the inside of the enclosure, through opening S (which may include a screen) and which is arranged to close off the air inside the enclosure by flap $V_F$ when a body is thrown by the force of a collision against the expanded casing causing flap $V_F$ to seal opening S. In this way the protection means forms a pneumatic buffer. If desired, one or more such valves may be employed at different locations about the surface of the enclosure.

By selecting a suitable shape for the blanks with pertaining channel systems, a very great variety of configurations can be obtained for the enclosure. Some embodiments are shown in FIGS. 5, 6, 7 and 8 and 9. As can be seen in FIG. 5, for example, the enclosures may also be given a rounded shape although they are composed of flat blanks. In the embodiments according to FIG. 5, which may be considered as a driver protection means corresponding to that shown in FIG. 1, the protection means is composed of several blanks 14.

One such blank 14 is shown spread out in planar fashion in FIG. 6. The single blank 14 comprises the fields 15, 16 and 17 and is produced from a flat limp piece of material. Each blank is joined to an adjacent blank along the free edges 19. The channels 18 are also manufactured from flat material blanks, as will be described later, and both these and the corresponding edges are curved, as can be seen. Thus, due to the forces occurring during the expansion, which hold together the joined blanks along their edges, the enclosure will in this case assume a more rounded configuration than that shown in FIG. 1, as can be seen in FIG. 5, where the fields between the channels form curved surfaces in spite of the fact that both the wall blanks and the channel blanks are manufactured from flat pieces.

FIG. 7 shows in sideview an embodiment intended for front-seat passengers. The flat blank for the enclosure shown in FIG. 7 is illustrated in FIG. 8 wherein the dotted lines 70 – 75 generally correspond to the vertices 70 – 75 of the assembled safety bag of FIG. 7. Lines 76 and 77 represent the folds made between the side panels 78 and 79 and the main pannel 80. It is clear that in this case some of the channels are common to various fields, and this is sometimes an advantage.

The protective bags may also be composed of several blanks which together or individually form a pneumatic buffer when expanded, constructed in accordance with the principles described above, but which together form a collision protection means. Thus, FIG. 9 shows a combined protection means for front-seat passengers, having at least one central section 11 which protects the head and trunk of the passenger in a head-on crash, and two side protection means which protect the body 20 of the passenger if he is thrown obliquely forward.

Figure 10:
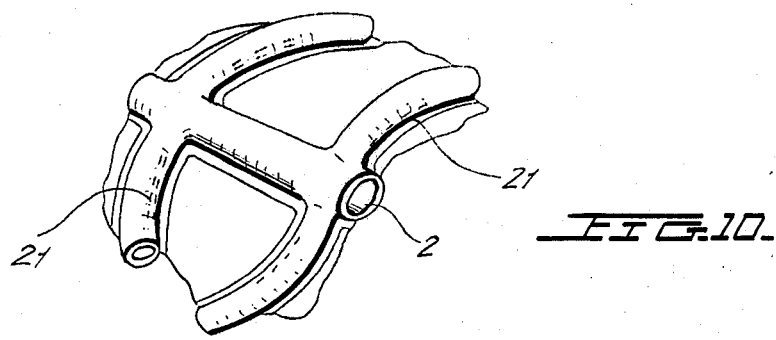
FIG. 10 is a perspective view showing a few channel intersections in expanded state, pertaining to a protection means according to the invention.

FIG. 10 shows, in enlarged fashion, another way of obtaining fields with curved surfaces, instead of bending the channels when the blank is spread out as in FIG. 6. In the embodiment according to FIG. 10 the channel system has been provided with bend indications 21 so that only during the expansion will certain of the channels be caused to assume a curved shape. Such bend indications 21 can be made in the channel material either before or after it has been joined to the flat wall blank.

As has been stated, the enclosure is produced by joining the flat blanks which in turn are produced by joining the flat channel blanks of the various flat wall blanks. In this way the enclosure can be manufactured easily with little waste.

It has proved advisable to manufacture the wall blank of a strong and flexible material, for example a textile woven fabric of nylon, Orlon, terylene or Dacron. Extremely strong and flexible blanks can be obtained through the choice of material and method of weaving.

The wall material of the shell need not be gas-tight. In fact it has been found to be an advantage if it is permeable to air to a certain extent. Air-tight walls might offer such elasticity in the expanded shell that a body thrown against it would rebound, thus involving added risk of injury. The free edges of the blanks can of course be joined in many different ways. For example, it has been found that stitching is a suitable method if the blanks are made of a textile material.

In accordance with the above, both the wall blanks and the blanks which are to form the channels can easily be manufactured from flat pieces of material cut to suitably shaped material blanks. The following is a description of how the entire channel system or parts thereof can easily be combined from the flat, cut-out material blanks. Since the flat channel blanks can also easily be fitted together with the similarly flat wall blanks, enclosures can be manufactured within the scope of the invention, extremely rationally and with little waste material, to provide extremely efficient and reliable collision protection means. It will also easily be understood that, within the scope of the invention, the joining process can be performed in stages and in different sequence as is convenient with respect, for example, to how it is practically desired to manufacture the collision protection means. For instance, in certain cases it may be suitable for the flat material blanks for the channel system to be joined first and then be joined to the flat wall blanks. In other cases it may be advisable for at least some of the wall blanks to be joined along their free edges before the channel blanks are attached to the wall blanks.

Figure 11:
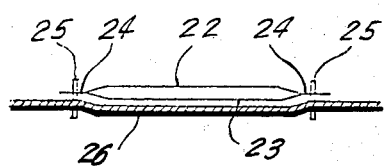
FIG. 11 shows a section through a channel construction in unexpanded state, suitable for the protection means proposed according to the invention.
Figure 12:
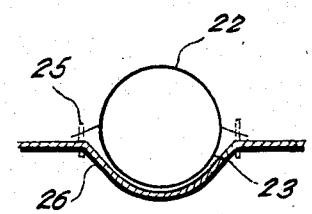
FIG. 12 shows the channel according to FIG. 11 in expanded state.

FIG. 4 shows a part of the communicating channel system in expanded state. FIG. 12 shows a section through a channel in the channel system, also in expanded state. FIG. 11 shows a section through the same channel in unexpanded state, from which it can be seen that the channel is composed of an upper part 22 and a lower part 23. Both the upper and lower parts according to the invention are manufactured from flat pieces of material and the pieces are joined in a suitable manner along their long sides. 25 designates suitable members for attaching the channel sections to the wall 26 of the enclosure, also manufactured from a flat piece of material.

Textile material, for example, such as nylon or Orlon, or plastic films, for example of poly olefins such as low density (LD) polythene or PVC, may be used for the material in such channel blanks. The plastic films have the advantage that they are easy to join, for example by means of thermoplastic welding. In certain cases the lower part 23 may also constitute the actual enclosure 26. In this case, the upper part 22 is attached directly onto the enclosure 26.

As mentioned, FIG. 12 shows a channel section in expanded state. If the material of the channel sections 22 and 23 is woven, the jointure 24 along the edges is preferably done by stitching. According to this embodiment it is also preferable if the material is coated at least on one side with a gastight layer, for example of a thermoplastic. This reduces gas leakage when the channel system is supplied with compressed gas, which is an advantage in view of the quantities of gas required for a rapid expansion. If said plastic layers face each other, the upper part 22 and the lower part 23 can easily be joined in a gastight manner by means of thermoplastic welding, for example.

Figure 13:
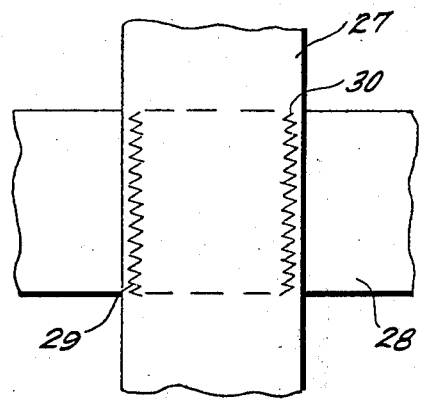
FIGS. 13 – 16 show plan views of various embodiments of channel intersections.

From FIG. 13 it is clear how the blanks forming the channel system can easily be manufactured with very little waste. The upper part 22 and lower part 23 can be made from strips 27, 28 of thermoplastic material, for instance, which are heat-sealed, preferably to be gastight, along the stretches 29 and 30. Correspondingly, of course, the upper part 22 and lower part 23 can, if they are made of a textile woven fabric, be manufactured by sewing together tapes of nylon or Dacron weave, for example. In the same way, it is easy to join the upper and lower parts by means of thermoplastic welding if these are coated internally with thermoplastic.

Figure 14:
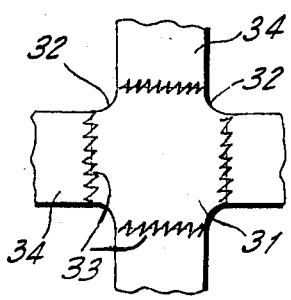
Figure 15:
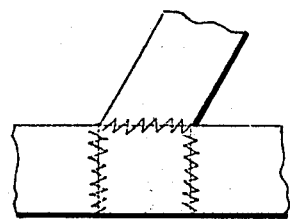
Figure 16:
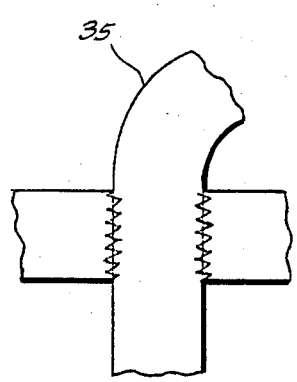

FIGS. 14, 15 and 16 show further embodiments of the channel blanks. FIG. 14 shows an intersection comprising a piece 31 having concave arcuate corners 32, and being joined along the lines 33 to strips 34. FIGS. 15 and 16 show other alternative embodiments. In all cases, the joints have been shown schematically by a zig-zag line. The embodiment shown in FIG. 16 has been found suitable for producing curved connections 35, for example, to the compressed gas system.

It is easily understood that channel systems or parts of channel systems which have been manufactured as described by joining channel blanks cut out of flat pieces of material, are suitable for mass production.

If, for example, the upper and lower parts of the channel system consist of a thermoplastic material, the upper and lower parts forming the network can each be punched out of plastic film, for instance, in one step. By then placing two such blanks comprising an entire channel system or a part thereof, one on top of the other, these can be joined in another step or steps along the longitudinal edges, for example, by means of thermoplastic welding. In the same way channel blanks punched or cut out of textile, for example, coated with thermoplastic material, can be quickly joined in a few operations by stitching and/or thermoplastic welding.

If the channel blanks are made of tapes, the complete channel system can be easily manufactured with very little waste material. Tapes of thermoplastic material, for example, can be stored rolled up and be rolled off in suitable lengths and desired configuration, to be cut and then joined to corresponding channel blanks cut out in the same way.

The above described method of manufacturing channel systems from flat material blanks has been found extremely advantageous since it is suitable for mass production and there is very little waste of material. Woven fabrics of textile or films of thermoplastic material have been mentioned as suitable material. The invention is not limited to these, but is suitable for many different materials or combinations of material. One important factor, however, which has been mentioned before, is that the materials and material combinations used provide a flexible channel system. A gas-tight channel system is also to be preferred. Since another requirement is that the channel system must also be able to withstand a certain over-pressure upon expansion, however, embodiments in which the channels are made only of a plastic film have a certain disadvantage. This is because relatively thick plastic foils must be used to fulfill the requirement of great strength against the expansion pressure. However, this implies reduced flexibility, particularly along the zones where the upper and lower parts have been thermoplastically joined. This also applies to woven textiles coated with a thermoplastic and joined in a gastight manner. The following is a description of a few suitable embodiments which have been found to offer great advantages in this respect, and also methods of manufacturing them.

In this embodiment of the invention, each channel section is constructed of two different materials in combination, arranged so that the channels consist of an inner, gastight, thin flexible and extensible material and an outer, strong, flexible and, in relation to said inner material, less extensible material.

Figure 17:
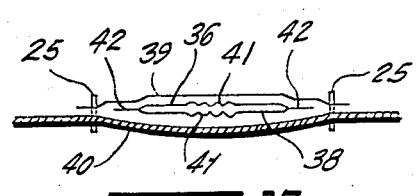
FIG. 17 shows a cross section through an unexpanded channel according to yet another embodiment of the invention.
Figure 18:
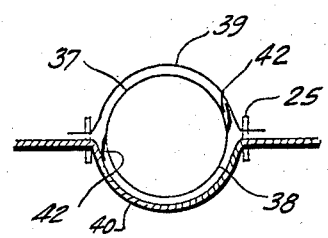
FIG. 18 shows the channel according to FIG. 17 in expanded state.

FIG. 17 shows schematically a cross-section of one embodiment of a channel constructed according to the invention and FIG. 18 shows the same channel in expanded state. A tubular inner space 36 is limited by inner walls 36 and 38 of a gas-tight, thin and flexible material which has greater elasticity upon inflation than an outer wall surrounding the inner space on all sides and manufactured out of strong and flexible material, forming an outer shell which, in the embodiment shown, consists of an upper part 39 and a lower part 40, both having relatively low elasticity. In this case the lower part 40 constitutes an integral part of the enclosure wall. 25 denotes members joining the upper part 39 to the lower part 40 and these members must also have relatively low elasticity. In this embodiment it is shown that the parts of the inner wall are not joined to the upper and lower parts 39, 40, respectively, of the outer wall. This is an advantage with respect to the flexibility of the material combination, which increases if the inner and outer walls are movable in relation to each other, although the inner wall and the outer wall may be joined to each other at least pointwise or zonewise.

Comprehensive experiments have shown that it is most suitable if the upper and lower parts 39, 40 forming the outer wall consist of a strong material such as a woven textile of nylon or Orlon or of some other synthetic or natural fibre material. The wall of the enclosure may also be made of this material. A suitable choice, both as to material and weave, will give a strong and flexible outer wall having relatively low elasticity. In such a case, the inner wall is suitably of thin plastic material having good flexibility and good stretchability, which is greater than that of the outer wall. Stretchability as used herein means that the material can easily expand to its intended shape as a result of the forces exerted during the expansion, the inner wall having folds because the material has been folded or stretched in advance and/or because its strength is such that it can easily be extended by plastic and/or elastic deformation. The folds 41 in FIGS. 17 and 19 indicate symbolically that the material has been pleated and/or has good extensibility and can easily be expanded due to extension in one or more of the ways mentioned above. The parts 39, 40 forming the outer wall can in this case preferably be joined by means of a suitable seam 25 of nylon or terylene thread, for example. For various reasons seams are suitable, since they provide satisfactory strength and flexibility and also stitching is an extremely quick and inexpensive and yet highly reliable way of joining the two parts. In a certain embodiment of the channels, corresponding in principle to that shown in FIG. 17, it has been suitable for the thin innerwall material to have a stretchability of at least 20 %.

FIG. 18 illustrates a cross-section of the channel according to FIG. 17 in inflated state. Due to the supply of gas the material forming the thin, gastight inner wall has expanded and been stretched to define a round tube surrounded by the outer walls, also rounded. The spacing between inner wall 36 and outer parts 39, 40 has been exaggerated merely for purposes of simplicity. The material is not in itself dimensioned for the relatively high gas pressure prevailing. Because the parts 39, 40 forming the outer walls, and the seams 25 are in themselves strong enough to withstand the gas pressure and are relatively non-elastic, therefore, the material combination which in unexpanded state is extremely flexible and thin, can withstand high gas pressure without leaking, during and after expansion, the outer and inner walls forming a relatively stiff arrangement with substantially circular cross-section. Suitable choice of plastic material thus offers a channel which is extremely flexible and thin in folded state. It has been found, for example, that the inner wall in this case suitably consists of LD polythene, possibly mixed with so-called plastic rubber, in thicknesses of a maximum of 500 $\mu$ and preferably between 20 $\mu$ – 300 $\mu$. The material in itself permits considerable extension when inflated, but it may also be pleated as shown at 41 in FIG. 17.

A material which has in many ways shown itself to be extremely suitable, consists of polythene mixed with at least 10 % so-called plastic rubber. This material has great extensibility and stores well. The joined blank is suitably expanded by supplying compressed gas while being assembled. In this way a controlled and permanent stretching of the inner wall is obtained. As mentioned above the part 40 of the wall may consist of a part of the enclosure. Said part 40 may also consist of a separate part which is fastened on the enclosure in a suitable manner.

In its embodiment according to FIG. 17 the upper and lower parts of the inner wall are sealed in a gastight manner along the edges in zones 42, for example by heat sealing. It is also clear from FIG. 18 how the sealed edges are pressed against the parts 39 and 40 of the outer wall. It has been found that if the inner wall can be easily stretched, the strain on the sealed edges will be so slight that there is no risk of the seal being broken.

Figure 21:
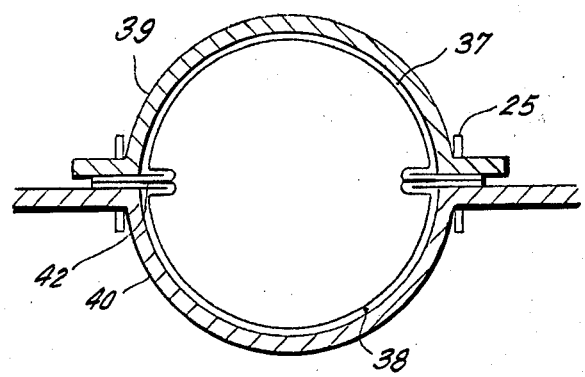
FIG. 21 shows an enlargement of the cross section through an expanded channel according to FIG. 20.
Figure 19:
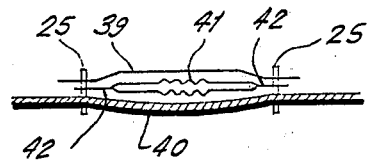
FIG. 19 shows a section through an unexpanded channel according to yet another embodiment of the invention.
Figure 20:
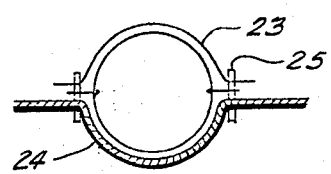
FIG. 20 shows the channel according to FIG. 19 in expanded state.

FIG. 19 shows another embodiment where the parts 39 and 40 of the outer wall have been joined by means of a seam 25, for example, which also passes through the edges of the inner wall in or outside the zones 42. FIG. 21 shows on an enlarged scale generally how the gas-tight edges react when they are forced against the outer wall by the gas pressure at the points where the upper and lower parts have been joined, for example, by a through-seam 25.

Figure 22:
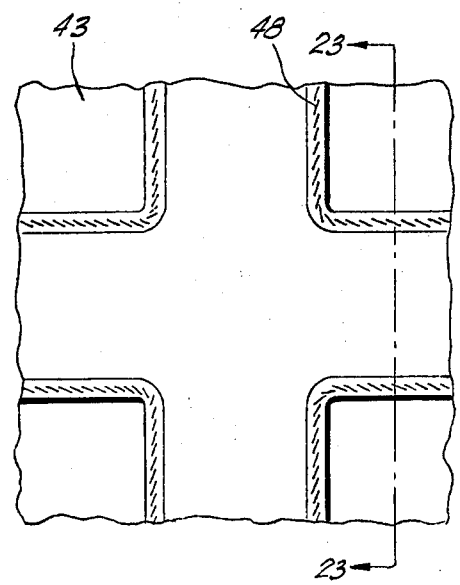
FIG. 22 shows a flat view of a channel intersection in unexpanded state.
Figure 23:
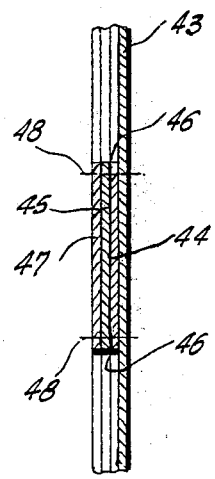
FIG. 23 shows a section along the line 23 — 23 in FIG. 22.

The embodiments according to FIGS. 17 – 20 have certain advantages over those described earlier. Since the inner wall is gas-tight, an inner tube is formed when inflation takes place and this can easily be used to construct a system of connected channels. This can be seen more clearly in FIGS. 22 and 23 where the lower part of the outer wall, which may constitute a part of the wall of the shell, is designated 43. 44 and 45 designate the parts intended for forming the inner wall which have been joined at 46. 48 designates the sewn seams which join the various parts. As can be seen in FIGS. 22 and 23, a connection between two intersecting channels can easily be effected since, in this case, the parts 44, 45 and 47 constitute cruciform-shaped pieces placed over the bottom piece 43.

Another advantage with the embodiments according to FIGS. 17 – 20 is that since the inner wall consists of two parts joined along the edges in zones as shown in these figures, the channel in unexpanded state has a total thickness which is only as much as the total material thickness even along the joined edges.

It is of course simple to manufacture the channel blanks forming the channel system according to FIGS. 22 and 23 with little waste. The thin, inner parts can be made of strips of thermoplastic material, for example, which are sealed in a gas-tight manner as shown in FIG. 13. The outer parts can also be manufactured in a corresponding manner, for example by joining tapes of nylon fabric, for example, by stitching.

As mentioned previously, the fields which are stretched out when the channel system is expanded, assume different planes with respect to each other and thus produce the three-dimensional configuration of the expanded enclosure. An exception is when a field has been divided into several part-fields in the same plane, stiffening channels having been arranged in the field. Such a case is illustrated by the arrangement according to FIG. 9 where the flat end field of the side protection means has been divided into four part-fields. The intersections between the various planes assumed by the field may be considered to constitute the boundary lines between respective fields. The channels employed to stretch out the field may be arranged in various ways in connection with the boundary lines of the field. Such examples of this will be shown in the following.

Figure 24:
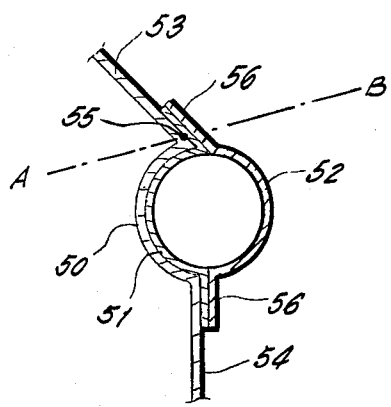

FIG. 24 shows a section through an expanded channel. 50 designates a part of the shell wall and 51 and 52 indicate two channel sections which together form the channel. According to the invention the channel has been produced by joining channel blanks cut out of flat pieces of material and attaching them to the wall of the shell. Upon expansion the channel and other parts of the channel system stretch out the various fields 53, 54 and cause them to assume different planes. In the embodiment according to FIG. 24, the broken line A – B passes through the boundary line between the planes formed by the fields 53 and 54. The point 55 designates where the planes intersect and are deflected in relation to each other. In this case, the boundary line substantially coincides with the deflection line of the field. The channel is thus arranged outside, but close to, the boundary line of the planes and the parts 51, 52 forming the channel are attached along their respective longitudinal edges 56 substantially on or outside the boundary line. In the example shown here, therefore, upon expansion of the channel the fields have been stretched out but at the same time the wall has been curved at the point 55.

Figure 25:
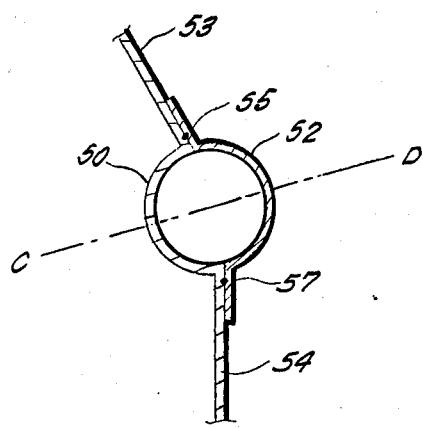

In the embodiment according to FIG. 25, the wall part 50 also forms a part of the channel, the other part being designated 52. The channel is in this case arranged along and about the boundary line between the two adjacent fields 53, 54, the broken line C – D being drawn through this plane, and this arrangement produces a deflection, i.e., a bending into a different plane, at the points 55, 57 on both sides of the channel.

Figure 26:
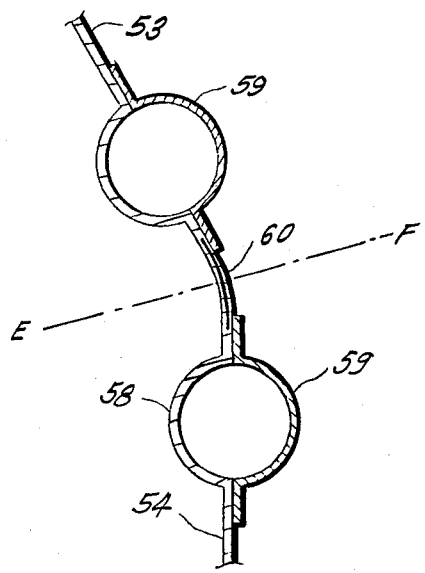

FIG. 26 shows another embodiment where a channel is arranged on each side of the boundary line of the plane of the adjacent fields 53, 54. The line E – F passes through the imaginary boundary line between the two fields 53, 54. Deflection occurs within the area 60. In this example the wall part 58 also forms part of the channels, the other channel parts being designated 59.

Figure 27:
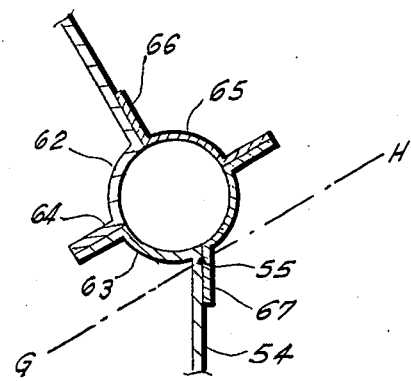

In the embodiment according to FIG. 27 the channel has been arranged outside, but close to the boundary line, which is intersected by the line G – H and deflection occurs near or at this point. In this case the channel is composed of four material blanks, the wall parts 62 and 63 being joined to yield a channel portion 65. This method of joining the channel blanks is to be preferred when, for example, several parts of the shell wall are to be joined and at the same time form parts of a channel arranged at the boundary line.

Figure 28:
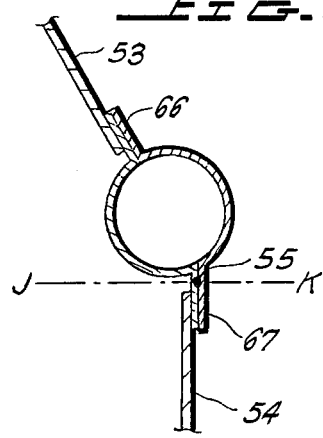

In the arrangement according to FIG. 28 the channel is arranged outside but close to the boundary line. The line J – K passes through the boundary line and the deflection occurs substantially along this. The wall sections 53 and 54 form fields and the channel is arranged between the wall sections and attached along their edges at 66 and 67.

Figure 29:
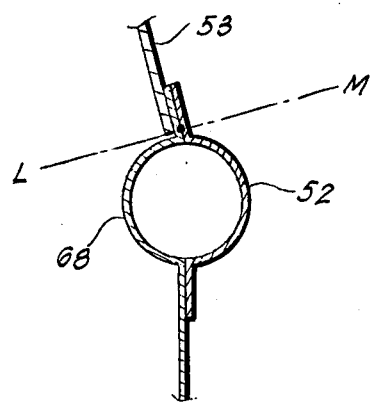

In the embodiment according to FIG. 29 the channel has been arranged close to but outside the line L – M which passes through the boundary line between two fields and along which the deflection substantially occurs. In this case, one wall section 68 of the shell also constitutes part of a channel and is joined to the channel part 52. The other, adjacent wall part 53 is attached to the channel substantially along the boundary line.

Figure 30:
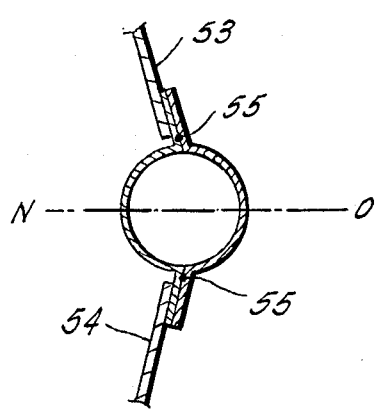

In the embodiment according to FIG. 30 the channel is arranged about the boundary line and the deflection occurs on both sides of the channel. The two wall sections 53 and 54 have been connected substantially along the deflection lines.

Figure 31:
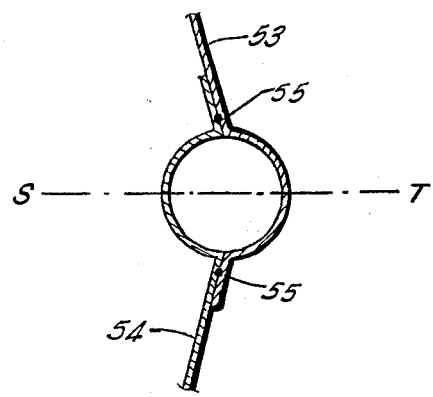

In the embodiment according to FIG. 31 the wall sections 53 and 54 are joined and also form channel sections. The channel is arranged about the boundary line through which the line S – T runs and the deflection occurs on both sides of the channel.

Figure 32:
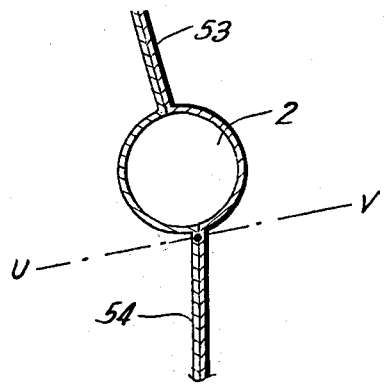
FIGS. 24 – 32 show cross sections of various embodiments of channels connected to the wall of the enclosure.

In FIG. 32 the shell wall consists of double material blanks 53 and 54 which also form the channel. In this case, the channel 2 is arranged close to but outside the boundary line through which the line U – V runs and the deflection occurs also substantially along the boundary line.

The embodiments described in FIGS. 24 – 32 show how the channels are arranged along the boundary lines of the fields/planes and where deflection is expected to occur. They also give examples of how the channels can be arranged by joining the channel blanks. Of course, other combinations of the embodiments exemplified are also feasible within the scope of the invention.

In all the examples shown in FIGS. 24 – 32 only single-walled channels have been shown for the sake of simplicity. However, as mentioned previously, the channels can also be constructed in a corresponding manner with inner and outer walls of preferably contrasting flexibility.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A method for manufacturing shock-absorbing safety devices for passengers in vehicles, comprising the steps of:

arranging a pair of sheets of a thin, flat, flexible, extensible and substantially gas tight material one upon the other;

joining the opposed longitudinal edges of the pair of sheets together to form a gas-tight inner wall of a channel;

arranging each of a pair of flexible, substantially inextensible flat sheets of material upon each of a pair of exterior surfaces of the channel inner wall;

joining adjacent edges of the outer sheets together to form an outer wall surrounding the inner channel wall;

forming an enclosure wall of a plurality of fields of flexible, substantially inextensible sheet material;

joining the outer wall around each channel to at least two of the flexible fields to form vertices at the boundaries between adjacent material fields;

connecting each channel of a plurality of channels to at least one of the remaining channels with their inner spaces being continuous and their respective sealed edges merging into and sealed to each other to form an enclosure expandable from a compact folded state to form a network of expandable and foldable channels connected to the enclosure wall; and providing at least one gas receiving inlet communicating with the channel network for receiving a supply of compressed gas to cause the enclosure wall to assume a predetermined configuration.

2. A method for manufacturing shock-absorbing afety devices for passengers in vehicles, comprising he steps of:

arranging a pair of thin, flat, flexible, extensible and substantially gas tight inner wall sheets of material in surface abutment with each other;

arranging each of a pair of flat, flexible, substantially inextensible outer wall sheets of material in abutment with one of an opposed outwardly directed pair of surfaces of the abutting inner wall sheets;

simultaneously forming a pair of seals joining the edges of the two inner wall sheets and the edges of the two outer wall sheets to simultaneously form the inner and outer walls of a channel; and forming an enclosure wall of a plurality of fields of flexible, substantially inextensible sheet material;

joining the outer wall around each channel to at least two of the flexible fields to form vertices at the boundaries between adjacent material fields;

connecting each channel of a plurality of channels to at least one of the remaining channels with their inner spaces being continuous to form an enclosure expandable from a compact folded state to form a network of expandable and foldable channels connectively arranged to the enclosure wall; and providing at least one gas receiving inlet communicating with the channel network for receiving a supply of compressed gas to cause the enclosure wall to assume a predetermined configuration.

3. A method for manufacturing shock-absorbing safety devices for passengers in vehicles, comprising the steps of:

arranging a pair of thin, flat, flexible, extensible and substantially gas tight inner wall sheets of material in surface abutment with each other;

arranging each of a pair of flat, flexible, substantially inextensible outer wall sheets of material in abutment with one of an opposed outwardly directed pair of surfaces of the abutting inner wall sheets;

simultaneously forming a first pair of seals joining the edges of the two inner wall sheets;

joining together the pair of outer wall sheets with a second pair of seals formed after the step of joining the pair of inner wall sheets together;

forming an enclosure wall of a plurality of fields of flexible, substantially inextensible sheet material;

joining the outer wall around each channel to at least two of the flexible fields to form vertices at the boundaries between adjacent material fields;

connecting each channel of a plurality of channels to at least one of the remaining channels with their inner spaces being continuous and their respective sealed edges merging into and sealed to each other to form an enclosure expandable from a compact folded state to form a network of expandable and foldable channels connected to the enclosure wall; and providing at least one gas receiving inlet communicating with the channel network for receiving a supply of compressed gas to cause the enclosure wall to assume a predetermined configuration.

* * * * *